US006990934B2

(12) United States Patent
Sugiyama et al.

(10) Patent No.: US 6,990,934 B2
(45) Date of Patent: Jan. 31, 2006

(54) INTERNAL COMBUSTION ENGINE HAVING VARIABLE COMPRESSION RATIO MECHANISM AND CONTROL METHOD THEREFOR

(75) Inventors: Takanobu Sugiyama, Yokohama (JP); Ryosuke Hiyoshi, Kanagawa (JP); Shunichi Aoyama, Yokosuka (JP); Shinichi Takemura, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 94 days.

(21) Appl. No.: 10/728,900

(22) Filed: Dec. 8, 2003

(65) Prior Publication Data

US 2004/0123818 A1    Jul. 1, 2004

(30) Foreign Application Priority Data

Dec. 27, 2002  (JP) .............................. 2002-382130

(51) Int. Cl.
  *F02B 75/04*      (2006.01)

(52) U.S. Cl. .................... 123/48 B; 123/78 F (58) Field of Classification Search ............. 123/48 R, 123/48 A, 48 AA, 48 B, 48 BC, 48 D, 78 R, 123/78 A, 78 AA, 78 B, 78 BA, 78 C, 78 D, 123/78 E, 78 F
See application file for complete search history.

(56) References Cited

U.S. PATENT DOCUMENTS

| 6,125,801 A | * | 10/2000 | Mendler .................. 123/48 R |
| 6,394,048 B1 | | 5/2002 | Styron |
| 2002/0104492 A1 | * | 8/2002 | Cowans .................... 123/48 R |

FOREIGN PATENT DOCUMENTS

| JP | 60230522 A | * | 11/1985 |
| JP | 7-3201 B2 | | 1/1995 |
| JP | 2001-263114 A | | 9/2001 |
| WO | WO 02/44537 A1 | | 6/2002 |

OTHER PUBLICATIONS

Michael Barr, Introduction to Closed-Loop Control, Aug. 2002, Embedded Systems Programming, pp 55-56.*
Patent Abstracts of Japan, vol. 010, No. 092, Apr. 9, 1986, JP 60-230526, Nov. 16, 1985.

* cited by examiner

*Primary Examiner*—Noah P. Kamen
(74) *Attorney, Agent, or Firm*—Foley & Lardner LLP (57) ABSTRACT

An internal combustion engine has a variable compression ratio mechanism operatable during an intake stroke to change an actual compression ratio of the engine, and is capable of correcting an amount of fuel injected into the engine in response to a change in the compression ratio.

14 Claims, 9 Drawing Sheets

INTERNAL COMBUSTION ENGINE HAVING VARIABLE COMPRESSION RATIO MECHANISM AND CONTROL METHOD THEREFOR

BACKGROUND OF THE INVENTION

The present invention relates to an internal combustion engine having a variable compression ratio mechanism, and more specifically relates to a technique for preventing an air-fuel ratio deviation that can be caused by a transient change in piston displacement volume under compression ratio control in the internal combustion engine. The present invention further relates to a control method for an internal combustion engine having a variable compression ratio mechanism.

Japanese Laid-Open Patent Publication No. 2001-263114 discloses one type of internal combustion engine having a variable compression ratio mechanism operatable during a piston intake stroke to control a compression ratio. This variable compression ratio mechanism includes a plurality of links (such as a connecting rod pivotally connected to a piston) and operates in such a manner that the compression ratio is set high in a low/middle-load engine operating range, or is set low in a low/middle-speed high-load engine operating range and high in a low/middle-speed low/middle-load engine operating range. By controlling the compression ratio in accordance with the engine speed and load as above, the engine can achieve a good balance of fuel economy and power output.

SUMMARY OF THE INVENTION

The compression ratio is generally shifted in a load direction so as to satisfy the demands for both the fuel economy and the power output. In high geared driving, the compression ratio quickly changes in response to accelerator pedal operation without an increase in the engine speed. Accordingly, there arises a possibility that, when the engine speed is relatively low, the compression ratio substantially changes during the intake stroke to thereby cause a transient change in piston displacement volume in the cycle.

For example, the piston displacement volume transiently increases with decrease in the compression ratio under fast acceleration. If a fuel injection amount has been decided before such an increase in piston displacement volume, an actual air-fuel ratio of the engine deviates from its target value toward a lean side. This leads to a deterioration of engine acceleration and exhaust performance.

It is therefore an object of the present invention to provide an internal combustion engine having a variable compression ratio mechanism that is capable of preventing an air-fuel ratio deviation under compression ratio control, e.g. at the time of fast acceleration, so as to maintain both of running (power output and fuel efficiency) performance and exhaust performance.

It is also an object of the present invention to provide a control method for such an internal combustion engine.

According to a first aspect of the invention, there is provided an internal combustion engine comprising a variable compression ratio mechanism operatable during an intake stroke to change an actual compression ratio of the engine, the engine being capable of correcting an amount of fuel injected into the engine in response to a change in the compression ratio.

According to a second aspect of the invention, there is provided an internal combustion engine comprising a variable compression ratio mechanism operatable during an intake stroke to change an actual compression ratio of the engine, the engine being capable of regulating a compression ratio control speed of the variable compression ratio mechanism.

According to a third aspect of the invention, there is provided a control method for an internal combustion engine, comprising: operating a variable compression ratio mechanism of the engine to change an actual compression ratio; allowing a fuel injection valve of the engine to inject fuel into the engine during exhaust and intake strokes; and controlling the fuel injection valve so as to correct the amount of fuel injected into the engine during the intake stroke in response to a change in the compression ratio.

According to a fourth aspect of the invention, there is provided a control method for an internal combustion engine, comprising: operating a variable compression ratio mechanism of the engine to change an actual compression ratio; and regulating a compression ratio control speed of the variable compression ratio mechanism in response to a change in the compression ratio.

The other objects and features of the present invention will also become understood from the following description.

DESCRIPTION OF THE EMBODIMENTS

The present invention will be described below by way of the following embodiments, in which like parts and portions are designated by like reference numerals to thereby omit repeated descriptions thereof.

Internal combustion engine 1 according to a first embodiment of the present invention will be now described with reference to FIGS. 1 to 8.

Figure 1:
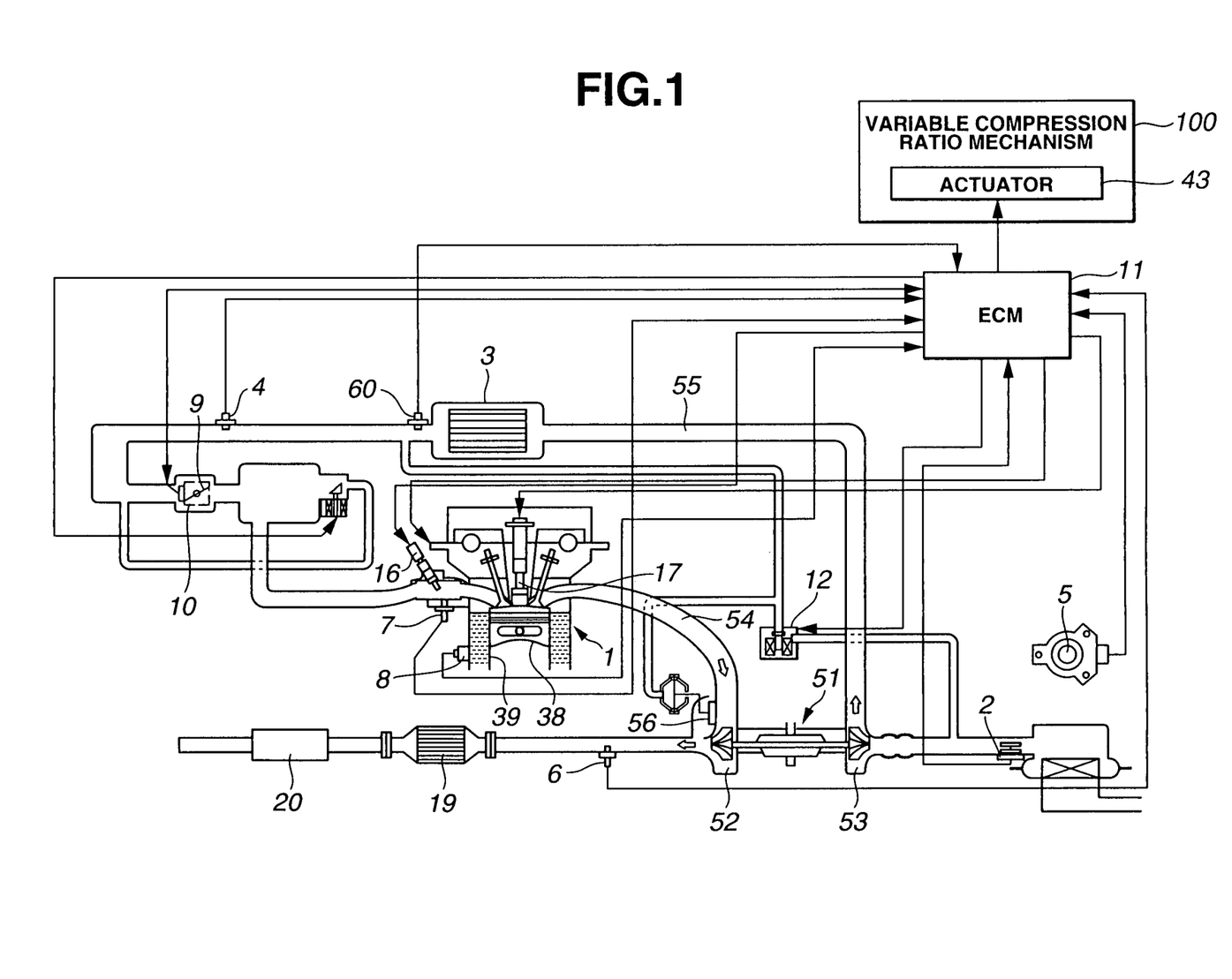
FIG.1 is a system configuration of an internal combustion engine having a variable compression ratio mechanism according to one exemplary embodiment of the present invention.

As shown in FIG. 1, internal combustion engine 1 has intake pipe 55, exhaust pipe 54, compressor 53, air flow meter 2, intercooler 3, intake pressure gauge 4, turbocharger (supercharger) 51, turbine 52, fuel injection valve 16, spark plug 17, piston 38, cylinder 39, crankshaft 31 (see FIG. 2), catalytic converter 19, muffler 20, engine control module (ECM) 11 and various sensors.

Compressor 53 is disposed in intake pipe 55. Air flow meter 2 is located at an upstream side of compressor 53 to detect an intake gas amount. Intercooler 3 is located at a downstream side of compressor 53, and intake pressure gauge 4 is located at a downstream side of intercooler 3 to detect a boost pressure. The installed sensors include crank angle sensor 5 to detect a crank angle and an engine speed Ne, oxygen sensor 6 to detect the concentration of oxygen in exhaust gas, knock sensor 8 to detect the occurrence of knocking, throttle sensor 10 to detect an opening of throttle valve 9 (hereinafter referred to as a "throttle valve opening TVO") and intake temperature sensor 60 to detect the temperature of intake gas at an outlet side of intercooler 3. The detection signals from these sensors 5, 6, 8, 10 and 60 are input to ECM 11 so that ECM 11 controls the operations of engine 1 in accordance with engine operating conditions. Turbine 52 is disposed in exhaust pipe 54. Turbocharger 51 is located concentrically to both of turbine 52 and compressor 53, and has exhaust bypass valve 56 to bypass a part of the exhaust gas from an upstream side of turbine 52 so as to control the boost pressure in accordance with the engine operating conditions. Fuel injection valve 16 is disposed on each cylinder 39 to inject fuel into an intake port of cylinder 39 and thereby form an air-fuel mixture in a combustion chamber. In the first embodiment, the fuel is injected during an exhaust stroke and an intake-stroke of piston 38 in every cycle. The air-fuel mixture is ignited by spark plug 17 to cause combustion in the combustion chamber. The combustion exhaust gas flows through exhaust pipe 54 to give a rotational energy to turbine 52. The exhaust gas is cleaned by catalytic converter 19, and then, the cleaned gas is discharged through muffler 20.

It is noted that engine 1 is designed as a four-cylinder engine and has three other sets of pistons 38, cylinders 39, fuel injection valves 16 and spark plugs 17 although not shown in FIG. 1. For identification, each piston 38 is given a number (see FIG. 6).

Further, internal combustion engine 1 has variable compression ratio mechanism 100 to control an engine compression ratio $\epsilon$.

Figure 2:
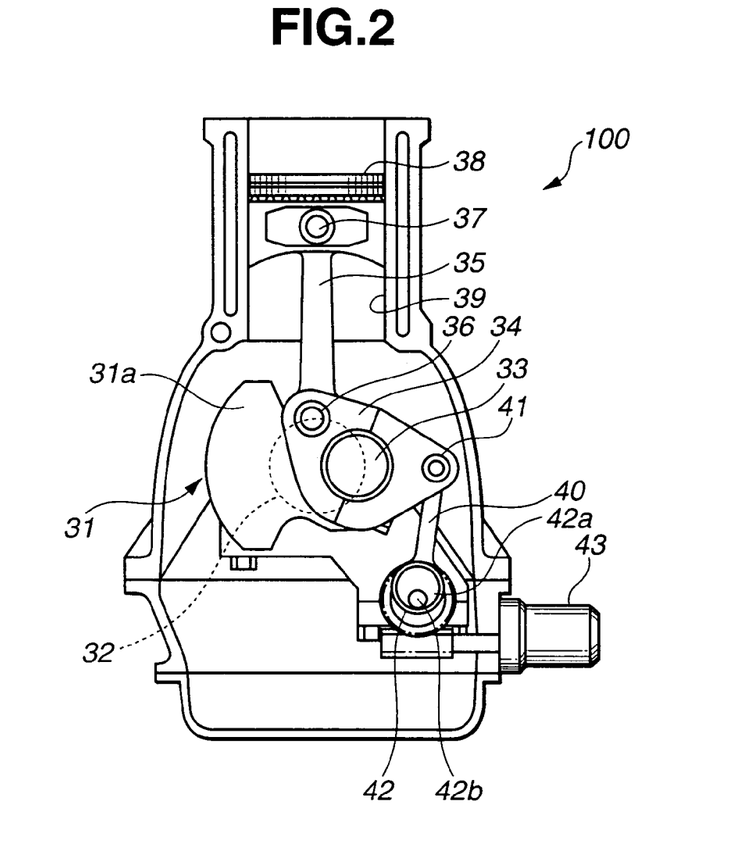
FIG. 2 is an assembled view of the variable compression ratio mechanism of FIG. 1.

As shown in FIG. 2, variable compression ratio mechanism 100 is coupled to crankshaft 31 and includes lower link 34, upper link 35 and control link 40 for each cylinder 39, control shaft 42 and actuator 43.

Crankshaft 31 has a plurality of journals 32, crankpins 33 and counterweight 31a. Journals 32 are rotatably supported on the main bearings of an engine cylinder block (not shown). Each crankpin 33 is located eccentrically to journal 32 by a given amount. An engagement hole is formed in substantially the center of lower link 34, and crankpin 33 is engaged in the engagement hole of lower link 34 such that lower link 34 can pivot about crankpin 33. Upper link 35 is pivotally connected at a lower end thereof to one end of lower link 24 by connecting pin 36 and is pivotally connected at an upper end thereof to piston 38 by piston pin 37. Piston 38, when subjected to a combustion pressure, develops a reciprocating motion in cylinder 39. The reciprocating motion is transmitted from piston 38 to crankshaft 31 while being converted into a rotational power through upper and lower links 35 and 34. Control link 40 is pivotally connected at an upper end thereof to the other end of lower link 34 by connecting pin 41 and is pivotally connected at a lower end thereof to an engine body e.g. an appropriate portion of the cylinder block via control shaft 42. Control shaft 42 has small-diameter portion 42b and large-diameter portion 42a eccentric to small-diameter portion 42b, and is supported on the engine body so that control shaft 42 can rotate about small-diameter portion 42b while being connected at large-diameter portion 42a to the lower end of control link 40. When control shaft 42 is rotated by means of actuator 43, the shaft center of large-diameter portion 42a relative to the engine body becomes shifted so as to displace the pivot point of control link 40 (i.e. the lower end of control link 40) and thereby change the position of piston 38 at piston top dead center (TDC). The compression ratio $\epsilon$ is then changed even during the intake stroke.

Herein, variable compression ratio mechanism 100 is in the form of a multi-link type piston stroke mechanism as described above. The multi-link type piston stroke mechanism has the advantage that the knock resistance of engine 1 becomes relatively stable against a change in the compression ratio E because the engine combustion chamber does not get distorted even when the compression ratio E is low and does not have edge and point that can cause surface ignition. Alternatively, variable compression ratio mechanism 100 may be in the form of a sub-piston type piston stroke mechanism as disclosed in Japanese Patent Publication No. 7-3201.

Figure 3:
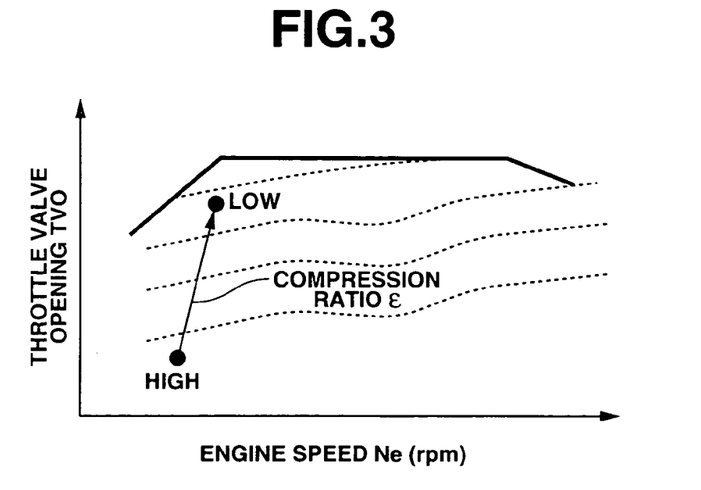
FIG. 3 is a diagram showing a compression ratio characteristic of the engine of FIG. 1.

As shown in FIG. 3, the compression ratio E is controlled in accordance with the engine speed Ne and the throttle valve opening TVO (i.e. engine load).

In the first embodiment, ECU 11 sets a target compression ratio so that variable compression ratio mechanism 100 adjusts an actual compression ratio to the target compression ratio. The target compression ratio is set to increase with decrease in the throttle valve opening TVO so as to obtain an improvement in fuel economy, and to decrease with increase in the throttle valve opening TVO so as to prevent the occurrence of knocking. Although the throttle valve opening TVO is used as an engine load parameter in the first embodiment, the accelerator pedal opening APO or intake gas amount may be used in place of the throttle valve opening TVO. Further, the target compression ratio is set to increase with the engine speed Ne. As the high-speed running of engine 1 develops a larger inertial force, it is alternatively possible to keep the target compression ratio constant when the engine speed Ne is relatively high.

The target compression ratio is converted into a target angle (position) of control shaft 42 (hereinafter referred to as a "target control shaft angle"). Upon receipt of input about an actual control shaft angle from a control shaft angle sensor (not shown), ECU 11 generates a feedback control signal based on a deviation between the actual control shaft angle and the target control shaft angle and drives actuator 43 under the control signal.

Figure 4:
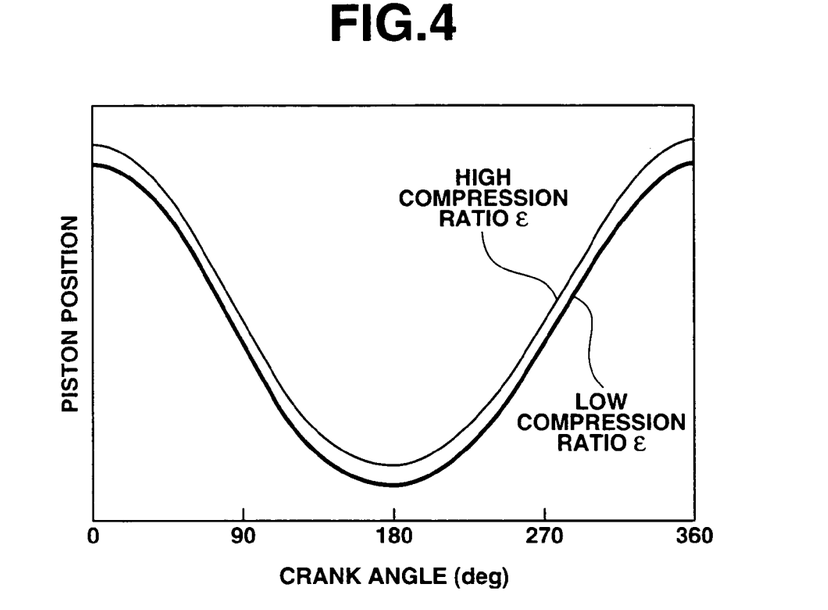
FIG. 4 is a diagram showing piston movements in high and low compression ratio states.
Figure 5:
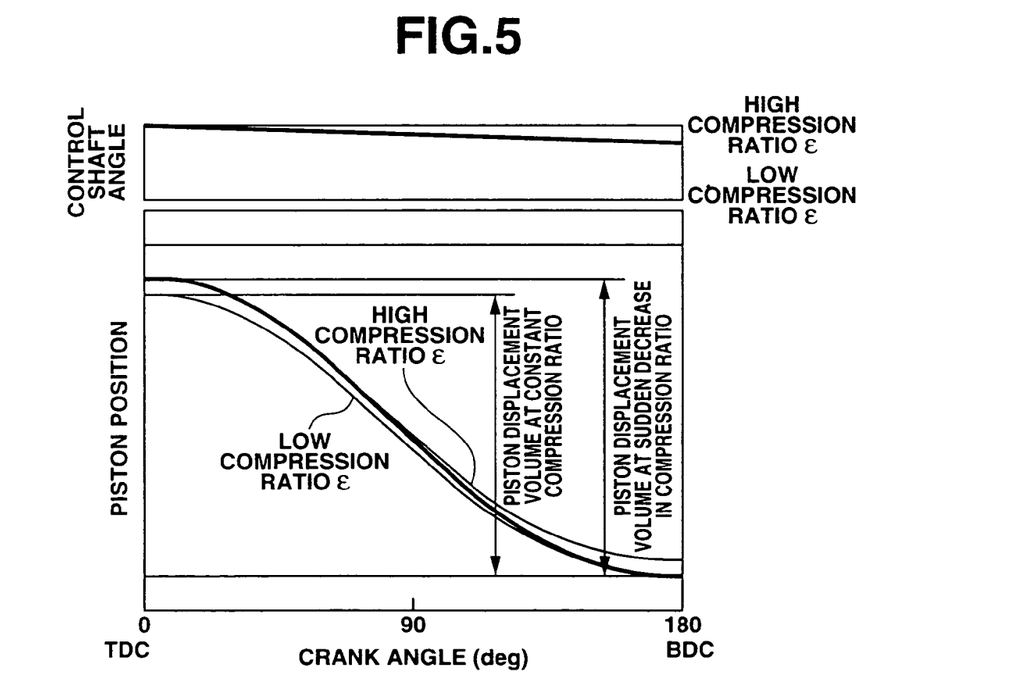
FIG. 5 is a diagram showing a piston movement at the time of shifting from a high compression ratio state to a low compression ratio state during a piston intake stroke.

As shown in FIGS. 4 and 5, the position of piston 38 varies with the crank angle.

At the time of shifting from a high compression ratio state to a low compression ratio state during the intake stroke between TDC and bottom dead center (BDC), the piston displacement volume transiently increases compared to the case where the compression ratio $\epsilon$ is kept constant. Such an increase in the piston displacement volume causes an increase in the amount of intake gas introduced into cylinder 39 in that cycle. If the fuel injection amount has been decided before the increase in the piston displacement volume, the actual air-fuel ratio of engine 1 deviates from a target air-fuel ratio toward a lean side.

On the other hand, the piston displacement volume transiently decreases at the time of shifting from a low compression ratio state to a high compression ratio state. If the fuel injection amount has been decided before the decrease in the piston displacement volume, the actual air-fuel ratio of engine 1 deviates from the target air-fuel ratio toward a rich side.

In order to avoid such an air-fuel ratio deviation, fuel injection is controlled as follows.

Figure 6:
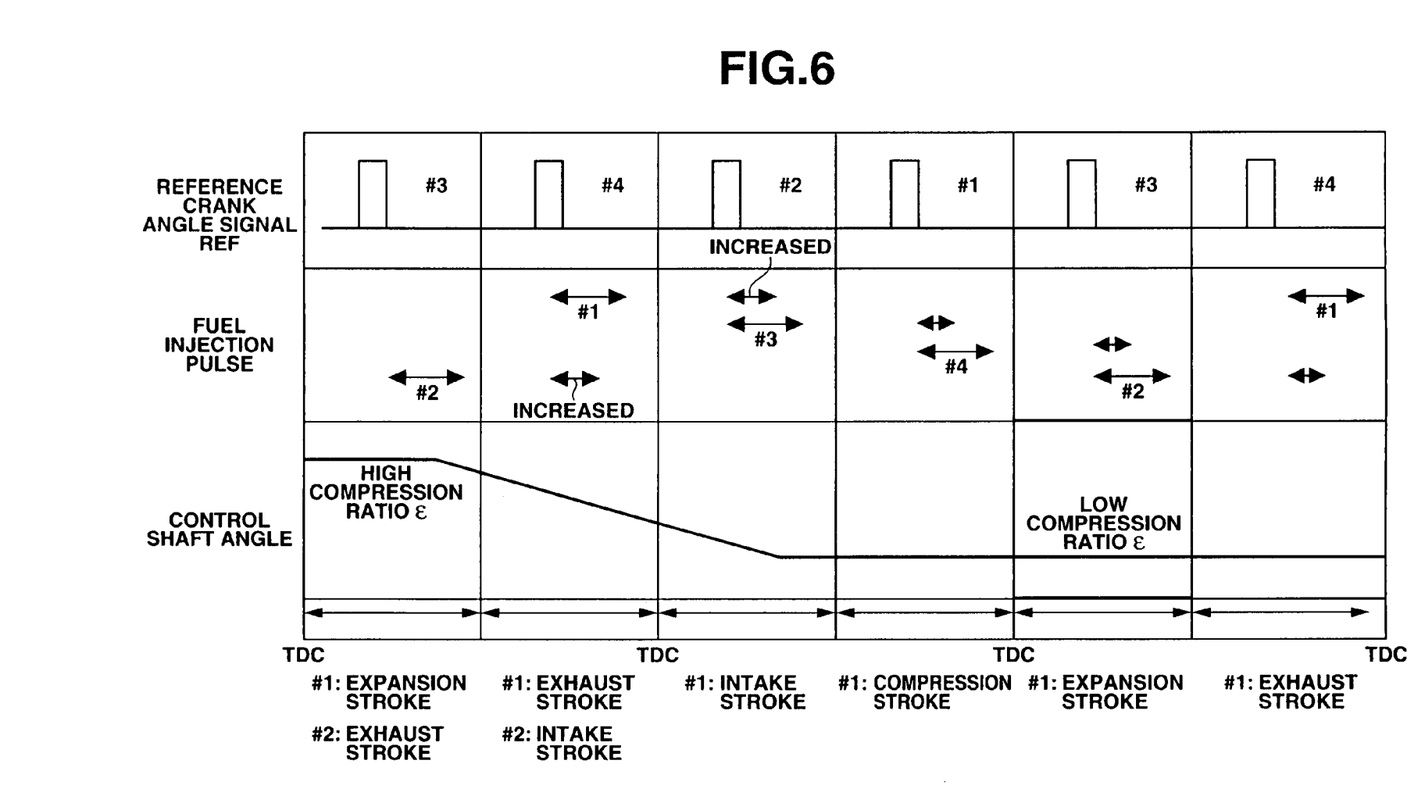
FIG. 6 is a diagram showing a fuel injection characteristic of the engine of FIG. 1.

As shown in FIG. 6, the fuel is injected in two steps per cylinder per cycle. Main fuel injection is performed on the exhaust stroke to inject a standard amount of fuel into the intake port of cylinder 39. After that, secondary fuel injection is performed on the intake stroke to inject an adjustable amount of fuel into the intake port of cylinder 30. (Hereinafter, the amount of fuel injected during the intake stroke is referred to as an "intake-stroke fuel injection amount.) When variable compression ratio mechanism 100 operates to change the compression ratio $\epsilon$, the intake-stroke fuel injection amount is corrected in response to the change in the compression ratio $\epsilon$ in such a manner that the intake-stroke fuel injection amount increases with decrease in the compression ratio $\epsilon$ and decreases with increase in the compression ratio $\epsilon$.

Figure 7:
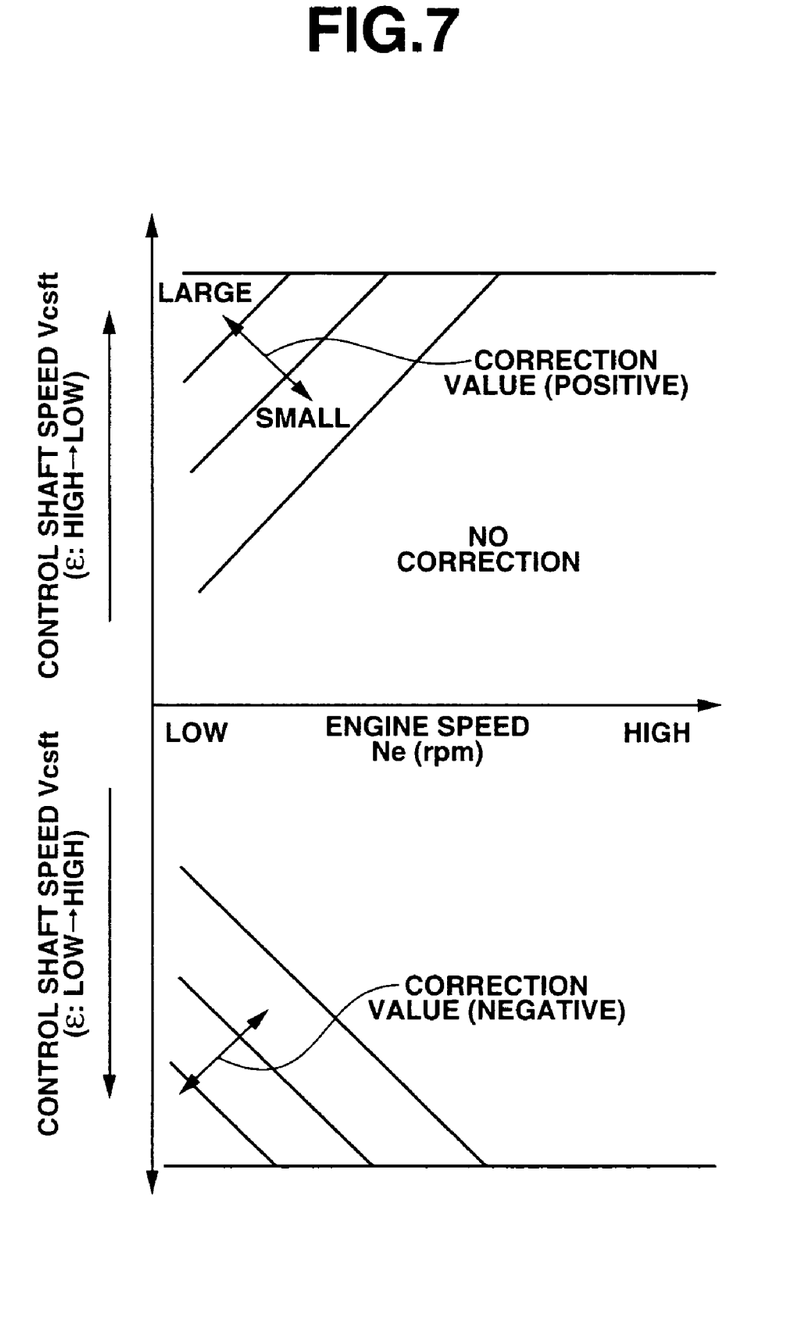
FIG. 7 is a fuel injection amount correction map according to a first embodiment of the present invention.

In the first embodiment, the intake-stroke fuel injection amount is corrected by determining a correction value with reference to a fuel injection amount correction map of FIG. 7 that defines the correction value relative to the engine speed Ne and the rotation speed of control shaft 42 (hereinafter referred to as a "control shaft speed Vcsft"). Herein, the control shaft speed Vcsft corresponds to a compression ratio control speed at which the compression ratio $\epsilon$ is changed.

As indicated in the correction map, the correction value is set at a positive value when control shaft 42 rotates in a direction that decreases the compression ratio $\epsilon$ and is set at a negative value when control shaft 42 rotates in a direction that increases the compression ratio $\epsilon$. Further, the amount of change in the piston displacement volume per cycle decreases with increase in the engine speed Ne when the compression ratio control speed is kept constant, and decreases with decrease in the compression ratio control speed when the engine speed Ne is kept constant. The correction value is thus set in such a manner that the absolute magnitude of the correction value increases with decrease in the engine speed Ne and with increase in the control shaft speed Vcsft.

Figure 8:
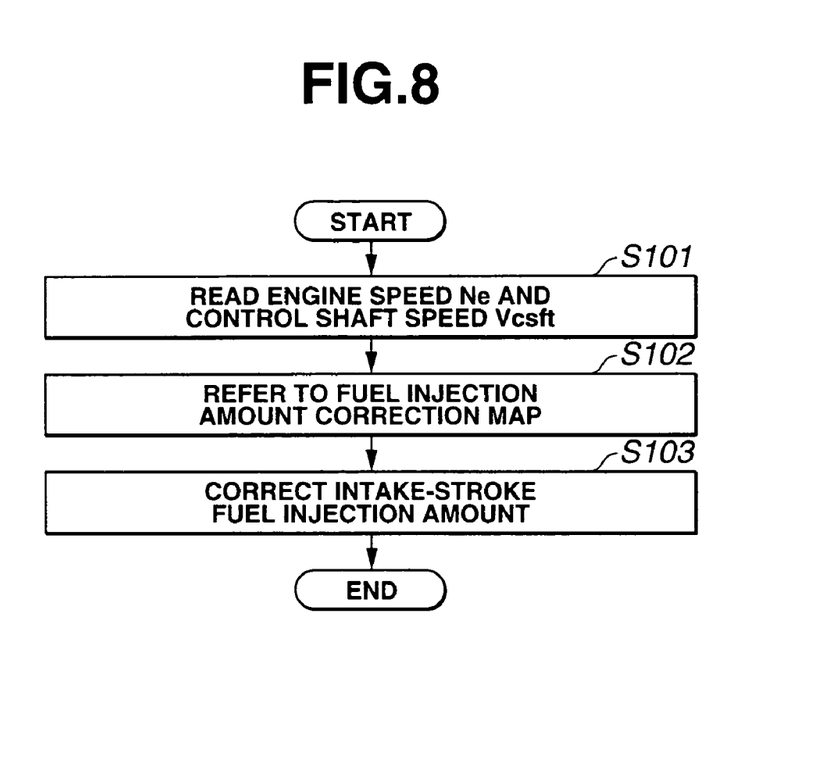
FIG. 8 is a flowchart for correction of a fuel injection amount according to the first embodiment of the present invention.

The correction of the intake-stroke fuel injection amount is carried out as indicated in FIG. 8.

In step S101, ECM 11 reads the engine speed Ne and the control shaft speed Vcsft in response to the change in the compression ratio $\epsilon$.

In step S102, ECM 11 refers to the fuel injection amount correction map and looks up the correction value in the correction map in correspondence with the engine speed Ne and the control shaft speed Vcsft.

In step S103, ECM 11 corrects the intake-stroke fuel injection amount based on the correction value to thereby adjust a fuel injection pulse width. Herein, the intake-stroke fuel injection amount is corrected by adding the correction value to a reference fuel amount. If the correction value is zero, the intake-stroke fuel injection amount is set at the reference fuel amount. If the correction value is greater than zero, the intake-stroke fuel injection amount increases by the correction value with respect to the reference fuel amount so as to be commensurate with the transient increase in the piston displacement volume. If the correction value is smaller than zero, the intake-stroke fuel injection amount decreases by the correction value with respect to the reference fuel amount so as to be commensurate with the transient decrease in the piston displacement volume This makes it possible to supply an appropriate amount of fuel to engine 1 and prevent an air-fuel ratio deviation that can be caused by a transient change in piston displacement volume under compression ratio control. The running and exhaust performance of engine 1 can be thus improved.

In addition, the following modification may be made to the first embodiment.

The air-fuel ratio needs to be a richer value than the stoichiometric air-fuel ratio (i.e. excess air factor $\lambda=1$) for higher power output in a low compression ratio state and be a leaner value than the stoichiometric air-fuel ratio for low fuel consumption in a high compression ratio state. It is thus desirable to control the air-fuel ratio to a richer value at the time of shifting from the high compression ratio state to the low compression ratio state and to control the air-fuel ratio to a leaner value at the time of shifting from the low compression ratio state to the high compression ratio state. If the fuel injection amount has been determined before the change of the compression ratio $\epsilon$, such air-fuel ratio control is not feasible.

Accordingly, the intake-stroke fuel injection amount can be corrected based on not only the first-mentioned correction value set in response to the transient change in the piston displacement volume but also a second correction value set to control the air-fuel ratio to a desired value. The second correction value is set to increase the fuel injection amount such that the air-fuel ratio becomes richer when the compression ratio $\epsilon$ decreases and to decrease the fuel injection amount such that the air-fuel ratio becomes leaner when the compression ratio $\epsilon$ increases. By this, it becomes possible to prevent the air-fuel ratio deviation under compression ratio control and, at the same time, control the actual air-fuel ratio promptly to the target air-fuel ratio, thereby obtaining a further improvement in the running and exhaust performance of engine 1.

Next, a second embodiment of the present invention will be explained below. The second embodiment is similar to the first embodiment, except for the correction procedure of the intake-stroke fuel injection amount. In the second embodiment, the intake-stroke fuel injection amount is corrected in response to the change in the piston displacement volume when the control shaft speed Vcsft is larger than or equal to a given value Vcsft1 and the engine speed Ne is lower than or equal to a given value n1. Further, the fuel injection amount correction value is determined based on the compression ratio control speed, i.e., the control shaft speed Vcsft in the second embodiment.

The basis for correcting the intake-stroke fuel injection amount at the time of Vcsft=Vcsft1 and Ne=n1 will be now explained.

It is assumed that engine 1 has a displacement volume of 500 cc and a variable compression ratio $\epsilon$ ranging from 8 to 15 and needs 0.1 second to change from the highest compression ratio to the lowest compression ratio (or change from the lowest compression ratio to the highest compression ratio).

When the engine speed Ne is a normal idling speed of 600 rpm, the compression ratio ε changes by the maximum amount between the highest compression ratio and the lowest compression ratio during a single rotation. That is, the compression ratio ε changes during the intake stroke by a half of the above maximum compression ratio change amount. At that time, the amount of change in the piston displacement volume during the intake stroke becomes approximately 17 cc and corresponds to 3.5% of the piston displacement volume. The air-fuel ratio of engine 1 deviates from the stoichiometric air-fuel ratio (A/F=ca. 14, λ=1) by about 0.5. There arises a need for correcting the intake-stroke fuel injection amount so as to reduce such an air-fuel ratio deviation.

When the engine speed Ne is lower than the idling speed, the intake stroke gets longer in time. The amount of change in the compression ratio ε during the intake stroke increases, and the need for correcting the intake-stroke fuel injection amount also increases.

On the other hand, when the engine speed Ne is higher than the idling speed, the amount of change in the compression ratio ε during the intake stroke decreases. The air-fuel ratio deviation is reduced to 0.5 or less. There is no necessity to correct the intake-stroke fuel injection amount.

It is thus reasonable to define a threshold engine speed and correct the intake-stroke fuel injection amount when the engine speed Ne is lower than or equal to the threshold engine speed.

Further, the amount of change in the compression ratio ε during the intake stroke increases with increase in the compression ratio control speed. Then, the need for correcting the intake-stroke fuel injection amount increases so as to prevent the air-fuel ratio deviation. It is also reasonable to define, with reference to the minimum compression ratio control speed (at which the intake stroke is longest), a threshold compression ratio control speed that leads to the air-fuel ratio deviation to be corrected and correct the intake-stroke fuel injection amount when the compression ratio control speed is higher than or equal to the threshold compression ratio control speed.

As the engine speed Ne is controlled to within a narrow speed range as above, the air-fuel deviation is more susceptible to the compression ratio control speed. The correction value can be thus determined based on the compression ratio control speed in the second embodiment.

Figure 9:
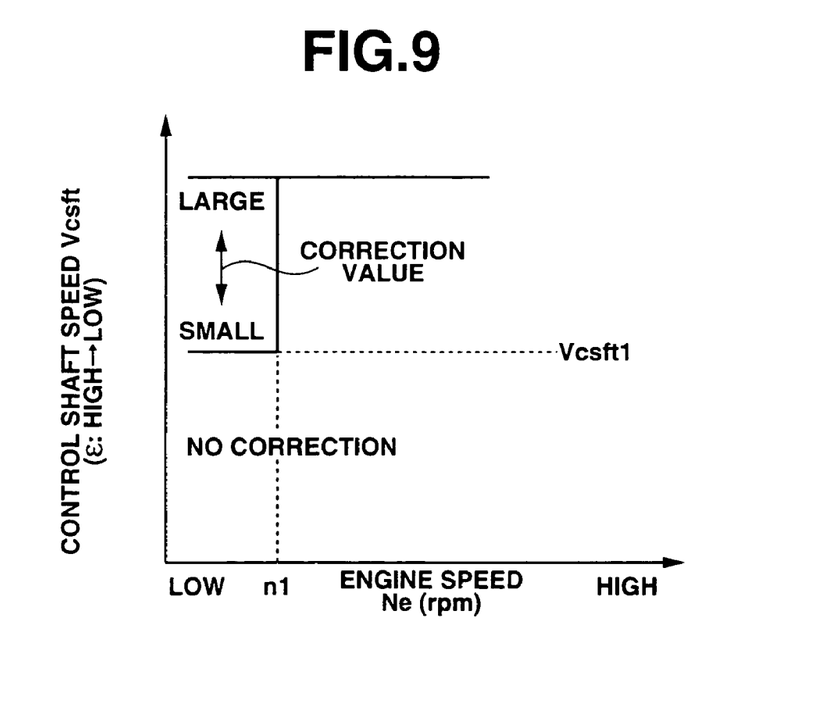
FIG. 9 is a fuel injection amount correction map according to a second embodiment of the present invention.

In the second embodiment, the correction value is determined with reference to a fuel injection amount correction map of FIG. 9. As indicated in the correction map, the correction value is set to increase with increase in the control shaft speed Vcsft at the time of Vcsft=Vcsft1 and Ne=n1. Although FIG. 9 only shows the positive correction value relative to the engine speed Ne and the control shaft speed Vcsft at the decrease in the compression ratio e, it is possible to set the negative correction value relative to the engine speed Ne and the control shaft speed Vcsft at the increase in the compression ratio e such that the absolute magnitude of the correction value increases with increase in the control shaft speed Vcsft and to correct the intake-stroke fuel injection amount at the time of Vcsft=Vcsft1 and Ne=n1 for the same reason above.

Figure 10:
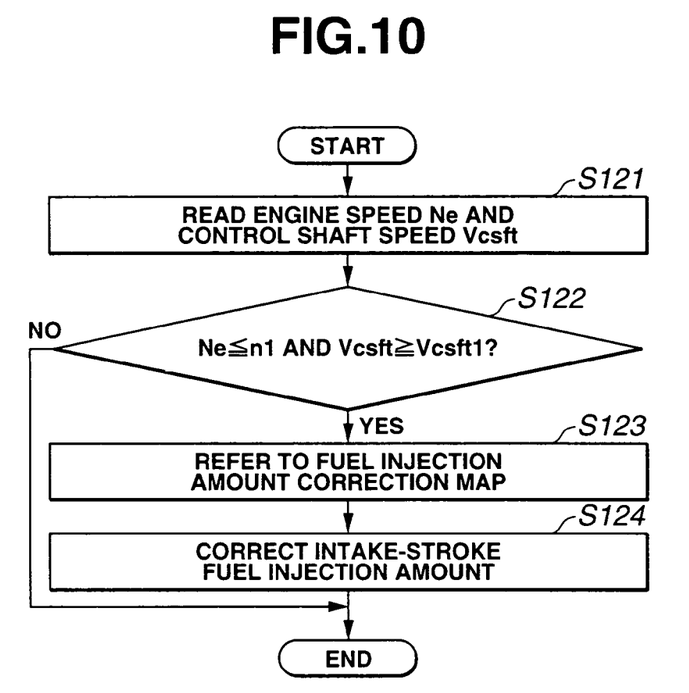
FIG. 10 is a flowchart for correction of a fuel injection amount according to the second embodiment of the present invention.

The correction of the intake-stroke fuel injection amount is carried out as indicated in FIG. 10.

In step S121, ECU 11 reads the engine speed Ne and the control shaft speed Vcsft.

In step S122, ECU 11 determines whether the control shaft speed Vcsft is larger than or equal to the given value Vcsft1 and the engine speed Ne is lower than or equal to the given value n1. If Yes in step S122, the program goes to step S123. If No in step S122, the program exits without correcting the intake-stroke fuel injection amount.

In step S123, ECM 11 refers to the fuel injection amount correction map and looks up the correction value in the correction map in correspondence with the control shaft speed Vcsft.

In step S124, ECM 11 corrects the intake-stroke fuel injection amount based on the correction value.

By this correction procedure, engine 1 is supplied with an appropriate amount of fuel. The air-fuel ratio deviation can be thus prevented even when the piston displacement volume transiently changes under compression ratio control, thereby attaining improvements in running and exhaust performance. In addition, the control of engine 1 becomes more simplified in the second embodiment.

Alternatively, the intake-stroke fuel injection amount can be corrected in the second embodiment based on not only the first-mentioned correction value set in response to the transient change in the piston displacement volume but also a second correction value set to control the air-fuel ratio to a desired value as in the first embodiment.

Figure 13:
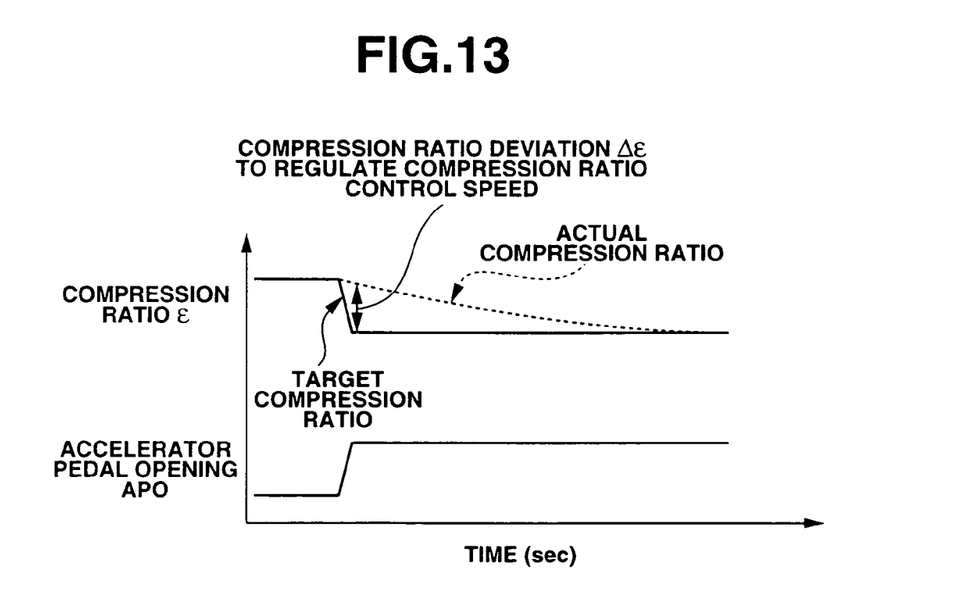
FIG. 13 is a diagram showing a secular change in the deviation between an actual compression ratio and a target compression ratio of the engine.

A third embodiment of the present invention will be explained below. The third embodiment is similar to the first embodiment, except for the correction procedure of the intake-stroke fuel injection amount. As shown in FIG. 13, the compression ratio control speed is generally determined in accordance with a deviation Δε between the actual compression ratio and the target compression ratio at the initial stage of acceleration (hereinafter just referred to as a "compression ratio deviation"). The correction value is thus set based on the engine speed Ne and the compression ratio deviation Δε in the third embodiment, so as to make substantially the same correction as in the first embodiment.

Figure 11:
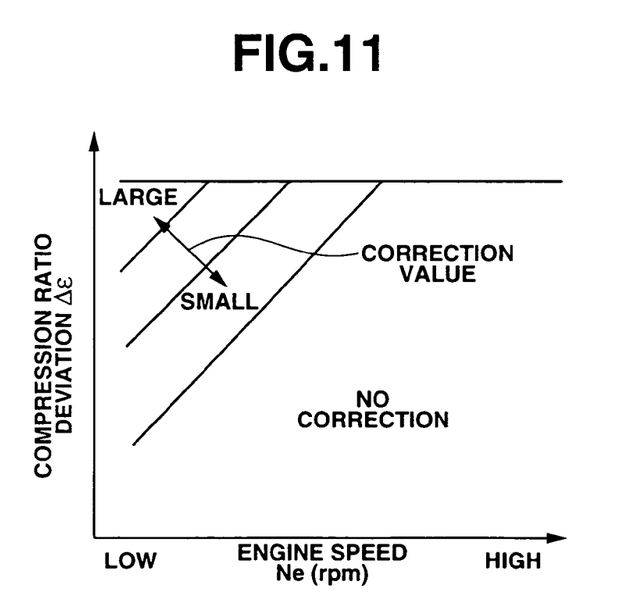
FIG. 11 is a fuel injection amount correction map according to a third embodiment of the present invention.

The correction value is determined with reference to a fuel injection amount correction map of FIG. 11 in the third embodiment. As indicated in the correction map, the correction value is set to increase with decrease in the engine speed Ne and increase with increase in the compression ratio deviation Δε. Although FIG. 11 only shows the positive correction value relative to the engine speed Ne and the compression ratio deviation Δε at the decrease in the compression ratio ε under acceleration, it is possible to set the negative correction value relative to the engine speed Ne and the compression ratio deviation Δε at the increase in the compression ratio ε under deceleration such that the absolute magnitude of the correction value increases with decrease in the engine speed Ne and increases with increase in the compression ratio deviation Δε.

Figure 12:
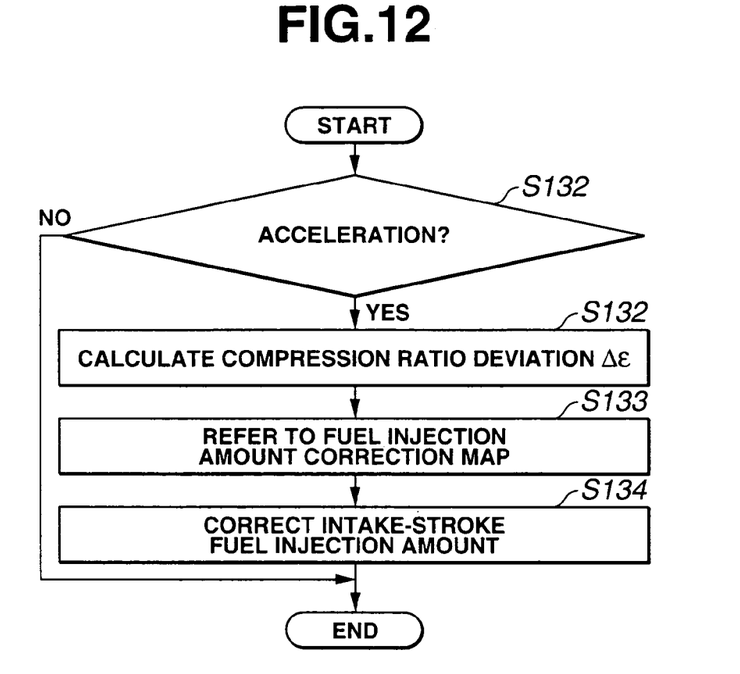
FIG. 12 is a flowchart for correction of a fuel injection amount according to the third embodiment of the present invention.

The correction of the intake-stroke fuel injection amount is carried out as indicated in FIG. 12.

In step S131, ECU 11 determines whether engine 1 is in an acceleration state. If Yes in Step S131, the program goes to step S132. If No in step S131, the program exits.

In step S132, ECU 11 calculates the compression ratio deviation Δε. For example, the compression ratio deviation Δε can be determined as a deviation between the actual control shaft angle and the target control shaft angle.

In step S133, ECU 11 refers to the fuel injection amount correction map to look up the correction value in the correction map in correspondence with the engine speed Ne and the compression ratio deviation Δε.

In step S134, ECU 11 corrects the intake-stroke fuel injection amount based on the correction value.

The air-fuel ratio deviation can be thus prevented even when the piston displacement volume transiently changes under compression ratio control, thereby attaining improvements in running and exhaust performance. In addition, the compression ratio control speed, i.e., control shaft speed Vcsft is not necessarily detected to correct the fuel injection amount. This makes it possible to easily make a judgment about whether the fuel injection amount needs correction or not at a relatively early stage without being affected by noises resulting from the detection of the control shaft speed Vcsft and thereby prevent a deterioration in driveability due to the air-fuel ratio deviation more effectively.

As in the first and second embodiments, the intake-stroke fuel injection amount may alternatively be corrected in the third embodiment based on not only the first-mentioned correction value set in response to the transient change in piston displacement volume but also a second correction value set to control the air-fuel ratio to a desired value.

Finally, a fourth embodiment of the present invention will be explained below. The intake-stroke fuel injection amount is corrected in response to the transient change in the piston displacement volume under compression ratio control in the first to third embodiments. However, the amount of such a transient change in the piston displacement volume can be reduced by regulating the compression ratio control speed (i.e. control shaft speed Vcsft). Accordingly, the compression ratio control speed is regulated in accordance with the engine speed Ne and the compression ratio deviation $\Delta\epsilon$ in the fourth embodiment so as to prevent the air-fuel ratio deviation under compression ratio control.

Figure 14:
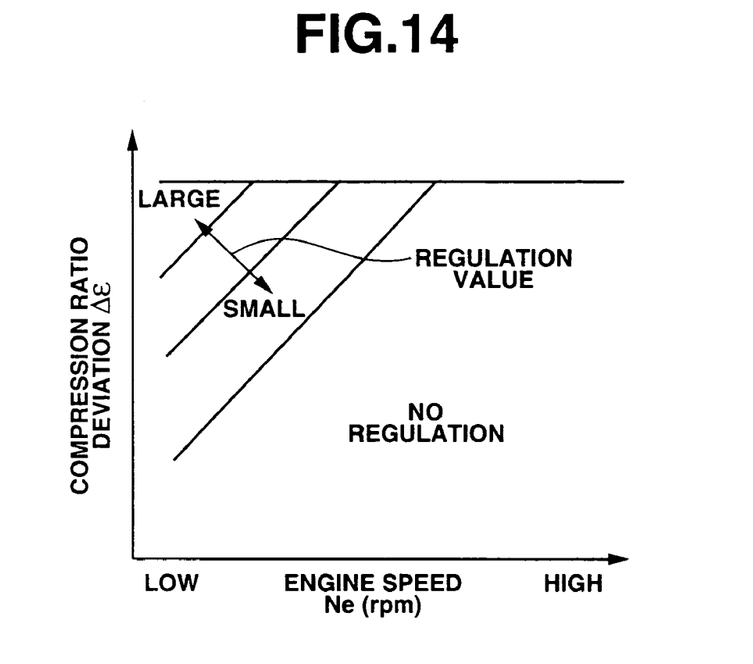
FIG. 14 is a compression ratio control speed regulation map according to a fourth embodiment of the present invention.

In the fourth embodiment, the compression ratio control speed is regulated by determining a regulation value with reference to a compression ratio control speed regulation map of FIG. 14. As indicated in the regulation map, the regulation value is set to increase with decrease in the engine speed Ne and to increase with increase in the compression ratio deviation $\Delta\epsilon$. Herein, a larger regulation value means that the maximum compression ratio control speed is regulated to a lower value. Although FIG. 14 only shows the regulation value relative to the engine speed Ne and the compression ratio deviation $\Delta\epsilon$ at the decrease in the compression ratio $\epsilon$ under acceleration, it is also possible to set the regulation value relative to the engine speed Ne and the compression ratio deviation $\Delta\epsilon$ at the increase in the compression ratio $\epsilon$ under deceleration.

Figure 15:
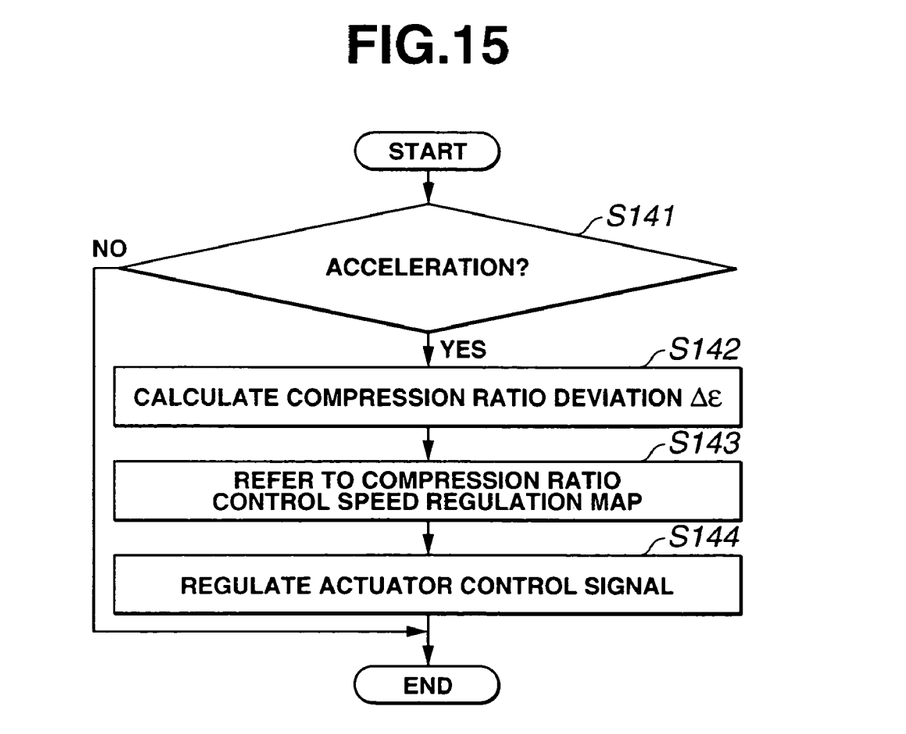
FIG. 15 is a flowchart for regulation of a compression ratio control speed according to the fourth embodiment of the present invention.

The compression ratio control speed is regulated as indicated in FIG. 15.

In step S141, ECU 11 determines whether engine 1 is in an acceleration state. If Yes in step S141, the program goes to step S142. If No in step S141, the program exits.

In step S142, ECU 11 calculates the compression ratio deviation $\Delta\epsilon$. For example, the compression ratio deviation $\Delta\epsilon$ can be determined as a deviation between the actual control shaft angle and the target control shaft angle.

In step S143, ECU 11 refers to the compression ratio control speed regulation map and looks up the regulation value in the regulation map in correspondence with the engine speed Ne and the compression ratio deviation $\Delta\epsilon$.

In step S144, ECU 11 regulates the actuator control signal based on the regulation value so as to control the compression ratio control speed.

The transient change in the piston displacement volume under compression ratio control can be thus minimized so as to prevent the air-fuel deviation and thereby avoid a deterioration in the running and exhaust performance of engine 1.

Although the regulation value is set to regulate the control shaft speed Vcsft in the fourth embodiment, the regulation value may alternatively be set to regulate the maximum current amount when engine 1 is configured to control the compression ratio $\epsilon$ by current regulation, or to regulate the maximum duty ratio when engine 1 is configured to control the compression ratio $\epsilon$ by regulating the duty solenoid of a hydraulic circuit. Further, the compression ratio control speed can be regulated based on not only the above-mentioned regulation value set in response to the transient change in piston displacement volume but also a second regulation value set to control the air-fuel ratio to a desired value.

As described above, it is possible in the above-described first to fourth embodiments of the present invention to prevent an air-fuel ratio deviation under compression ratio control and thereby obtain improvements in running (power output and fuel efficiency) performance and exhaust performance in a transient driving state.

The entire contents of Japanese Patent Application No. 2002-382130 (filed on Dec. 27, 2002) are herein incorporated by reference.

Although the present invention has been described with reference to specific embodiments of the invention, the invention is not limited to the above-described embodiments. Various modification and variation of the embodiments described above will occur to those skilled in the art in light of the above teaching. The scope of the invention is defined with reference to the following claims.

What is claimed is:

1. An internal combustion engine, comprising:
   a cylinder having an intake port;
   a fuel injection valve to inject fuel into the intake port of the cylinder during an exhaust stroke and an intake stroke, the fuel being injected in a first fuel amount during the exhaust stroke and in a second fuel amount during the intake stroke;
   a variable compression ratio mechanism operable during the intake stroke to change an actual compression ratio of the engine; and
   a control module to control the fuel injection valve so as to correct the second fuel amount in response to the change in the compression ratio.

2. An internal combustion engine according to claim 1, wherein the amount of fuel injected into the engine is corrected so as to increase with decrease in the compression ratio.

3. An internal combustion engine according to claim 1, wherein the amount of fuel injected into the engine is corrected so as to decrease with increase in the compression ratio.

4. An internal combustion engine according to claim 1, wherein the engine sets a correction value in accordance with an engine speed and a compression ratio control speed to correct the amount of fuel injected into the engine based on the correction value.

5. An internal combustion engine according to claim 1, wherein the engine sets a correction value in accordance with an engine speed and a deviation between the actual compression ratio and a target compression ratio to correct the amount of fuel injected into the engine based on the correction value.

6. An internal combustion engine according to claim 1, wherein the engine corrects the amount of fuel injected into the engine when an engine speed is lower than or equal to a first given value and a compression ratio control speed is higher than or equal to a second given value.

7. An internal combustion engine according to claim 6, wherein the engine sets a correction value in accordance with the compression ratio control speed to correct the amount of fuel injected into the engine based on the correction value.

8. An internal combustion engine comprising a variable compression ratio mechanism operable during an intake stroke to change an actual compression ratio of the engine, the engine setting a regulation value in accordance with an engine speed and a deviation between the actual compression ratio and a target compression ratio and regulating a compression ratio control speed of the variable compression ratio mechanism based on the regulation value.

9. A control method for an internal combustion engine, comprising:
   operating a variable compression ratio mechanism of the engine to change an actual compression ratio;
   allowing a fuel injection valve of the engine to inject fuel into the engine during exhaust and intake strokes; and
   controlling the fuel injection valve so as to correct the amount of fuel injected into the engine during the intake stroke in response to a change in the compression ratio.

10. A control method according to claim 9, wherein the amount of fuel injected into the engine during the intake stroke is corrected so as to increase with decrease in the compression ratio and decrease with increase in the compression ratio.

11. A control method according to claim 9, wherein said controlling comprises setting a correction value in accordance with an engine speed and a compression ratio control speed to correct the amount of fuel injected into the engine during the intake stroke based on the correction value.

12. A control method according to claim 9, wherein said controlling comprises setting a correction value in accordance with an engine speed and a deviation between the actual compression ratio and a target compression ratio to correct the amount of fuel injected into the engine during the intake stroke based on the correction value.

13. A control method according to claim 9, wherein said controlling comprises:
   determining whether an engine speed is lower than or equal to a first given value and a compression ratio control speed is higher than or equal to a second given value; and
   when the engine speed is lower than or equal to the first given value and the compression ratio control speed is higher than or equal to the second given value, setting a correction value in accordance with the compression ratio control speed to correct the amount of fuel injected into the engine during the intake stroke based on the correction value.

14. A control method for an internal combustion engine, comprising:
   operating a variable compression ratio mechanism of the engine to change an actual compression ratio;
   setting a regulation value in accordance with an engine speed and a deviation between the actual compression ratio and a target compression ratio; and
   regulating a compression ratio control speed of the variable compression ratio mechanism based on the regulation value.

* * * * *